US006939626B2

(12) United States Patent
Tang

(10) Patent No.: US 6,939,626 B2
(45) Date of Patent: Sep. 6, 2005

(54) MAGNETIC ANISOTROPY ADJUSTED LAMINATED MAGNETIC THIN FILMS FOR MAGNETIC RECORDING

(75) Inventor: Kai Tang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 41 days.

(21) Appl. No.: 10/628,011

(22) Filed: Jul. 24, 2003

(65) Prior Publication Data

US 2005/0019609 A1 Jan. 27, 2005

(51) Int. Cl.$^7$ ............................................. G11B 5/673
(52) U.S. Cl. ............................................. 428/694 TM
(58) Field of Search .................................. 428/694 TM

(56) References Cited

U.S. PATENT DOCUMENTS

| | | | |
|---|---|---|---|
| 5,051,288 A | | 9/1991 | Ahlert et al. |
| 5,462,796 A | | 10/1995 | Teng et al. |
| 5,851,643 A | * | 12/1998 | Honda et al. ............... 428/212 |
| 6,280,813 B1 | | 8/2001 | Carey et al. |
| 6,304,081 B1 | | 10/2001 | Richter |
| 6,777,112 B1 | * | 8/2004 | Girt et al. ............ 428/694 TM |
| 2001/0009730 A1 | | 7/2001 | Futamoto et al. |
| 2002/0098390 A1 | | 7/2002 | Hoa Van Do et al. |
| 2002/0132140 A1 | | 9/2002 | Igarashi et al. |
| 2002/0192506 A1 | * | 12/2002 | Coffey et al. ........ 428/694 TM |
| 2003/0017369 A1 | | 1/2003 | Hirayama et al. |
| 2003/0099866 A1 | * | 5/2003 | Takahashi et al. .... 428/694 BA |
| 2003/0232218 A1 | * | 12/2003 | Sato et al. ............... 428/694 T |

OTHER PUBLICATIONS

S.E. Lambert, et al., "Reduction of Media Noise in Thin Film Metal Media by Lamination", IEEE Transactions on Magnetics, vol. 26, No. 5, Sep. 1990, pp. 2706–2709.

E. S. Murdock, et al., "Noise Properties of Multilayered Co–Alloy Magnetic Recording Media", IEEE Transactions on Magnetics, vol. 26, No. 5, Sep. 1990, pp. 2700–2705.

A. Murayama, et al., "Interlayer Exchange Coupling in Co/Cr/Co Double–Layered Recording Films Studied by Spin–Wave Brillouin Scattering", IEEE Transactions on Magnetics, vol. 27, No. 6, Nov. 1991, pp. 5064–5066.

S. E. Lambert, et al., "Laminated Media Noise for High Density Recording", IEEE Transactions on Magnetics, vol. 29, No. 1, Jan. 1993, pp. 223–229.

E. Teng et al., "Flash Chromium Interlayer for High Performance Disks with Superior Noise and Coercivity Squareness", IEEE Transactions on Magnetics, vol. 29, No. 6, Nov. 1993, pp. 3679–3681.

* cited by examiner

*Primary Examiner*—Kevin M. Bernatz
(74) *Attorney, Agent, or Firm*—G. Marlin Knight

(57) ABSTRACT

Multiple embodiments of the invention are described which include at least two laminated ferromagnetic layers with differing magnetic anisotropy. The independent magnetic layer farther away from the recording head is selected to have a lower magnetic anisotropy to allow magnetic switching of the multiple magnetic layers to occur at approximately the same head write current even though the recording head field is reduced with increased distance from the head. The improved switching yields improved magnetic recording performance. Laminated magnetic media according to the invention can have a single peak in the normalized DC erase noise vs. head write current plot indicating that the magnetic transitions in the non-slave magnetic layers are written at the same head write current. As a result the magnetic pulse width ($PW_{50}$) is reduced, overwrite (OW) is improved and media signal-to-noise ratio ($S_oNR$) is improved. Alternatively one or both of the laminated ferromagnetic layers can be replaced with an antiferromagnetically (AF) coupled layer structure that has an AFC-master and an AFC-slave layer separated by a spacer layer selected to antiferromagnetically couple the AFC-master and AFC-slave layers.

6 Claims, 3 Drawing Sheets

MAGNETIC ANISOTROPY ADJUSTED LAMINATED MAGNETIC THIN FILMS FOR MAGNETIC RECORDING

FIELD OF THE INVENTION

The invention relates to magnetic thin film media with laminated magnetic layers and also to magnetic thin film media with laminated magnetic layers that have one or more antiferromagnetically coupled layer structures included therein and more particularly to magnetic properties and selection of materials used for the plurality of thin films in such media.

BACKGROUND OF THE INVENTION

A typical prior art head and disk system 10 is illustrated in block form in FIG. 1. In operation the magnetic transducer 20 is supported by the suspension 13 as it flies above the disk 16. The magnetic transducer 20, usually called a "head" or "slider," is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded.

The conventional disk 16 includes substrate 26 of glass or AlMg with an electroless coating of $Ni_3P$ that has been highly polished. The thin films 21 on the disk 16 typically include a chromium or chromium alloy underlayer and at least one ferromagnetic layer based on various alloys of cobalt. For example, a commonly used alloy is CoPtCr. Additional elements such as tantalum and boron are often used in the magnetic alloy. A protective overcoat layer is used to improve wearability and corrosion resistance. Various seed layers, multiple underlayers and laminated magnetic films have all been described in the prior art. The laminated magnetic films have included multiple ferromagnetic layers that are separated by nonmagnetic spacer layers and more recently antiferromagnetic coupling has been proposed. It is known that substantially improved SNR can be achieved by the use of a laminated magnetic layer structure. The reduced media noise is believed due to reduced exchange coupling between the magnetic layers. The use of lamination for noise reduction has been extensively studied to find the favorable spacer layer materials, including Cr, CrV, Mo and Ru, and spacer thicknesses from a few Angstroms upward that result in the best decoupling of the magnetic layers and the lowest media noise.

In U.S. Pat. No. 6,280,813 to Carey, et al. a layer structure is described that includes at least two ferromagnetic films antiferromagnetically coupled together across a nonferromagnetic coupling/spacer film. In general, it is said that the exchange coupling oscillates from ferromagnetic to antiferromagnetic with increasing coupling/spacer film thickness and that the preferred 6 Angstrom thickness of the ruthenium coupling/spacer layer was selected because it corresponds to the first antiferromagnetic coupling peak in the oscillation for the particular thin film structure. Materials that are appropriate for use as the nonferromagnetic coupling/spacer films include ruthenium (Ru), chromium (Cr), rhodium (Rh), iridium (Ir), copper (Cu), and their alloys. Because the magnetic moments of the two antiferromagnetically coupled films are oriented antiparallel, the net remanent magnetization-thickness product ($M_r t$) of the recording layer is the difference in the $M_r t$ values of the two ferromagnetic films. This reduction in $M_r t$ is accomplished without a reduction in the thermal stability of the recording medium because the volumes of the grains in the antiferromagnetically coupled films add constructively. An embodiment of the structure includes two ferromagnetic CoPtCrB films, separated by a Ru spacer film having a thickness selected to maximize the antiferromagnetic exchange coupling between the two CoPtCrB films. The top ferromagnetic layer is designed to have a greater $M_r t$ than the bottom ferromagnetic layer, so that the net moment in zero applied magnetic field is low, but nonzero. The Carey '813 patent also states that the antiferromagnetic coupling is enhanced by a thin (5 Angstroms) ferromagnetic cobalt interface layer added between the coupling/spacer layer and the top and/or bottom ferromagnetic layers. The patent mentions, but does not elaborate on the use CoCr interface layers.

In U.S. Pat. No. 6,567,236 to Doerner, et al., titled "Antiferromagnetically Coupled Thin Films for Magnetic Recording," an antiferromagnetically coupled layer structure for magnetic recording wherein the top ferromagnetic structure is a bilayer structure including a relatively thin first sublayer of ferromagnetic material in contact with the coupling/spacer layer. The first sublayer has a higher magnetic moment than the second sublayer. The second sublayer has a lower magnetic moment and is much thicker than the first sublayer with a composition and thickness selected to provide the $M_r t$ when combined with first sublayer that is needed for the overall magnetic structure. A preferred embodiment of a layer structure according to the patent is a pre-seed layer preferably of CrTi; a seed layer preferably of RuAl; an underlayer preferably of CrTi; a bottom ferromagnetic layer preferably of CoCr; an antiferromagnetic coupling/spacer layer preferably of Ru; and a top ferromagnetic structure including: a thin first sublayer of material preferably of CoCr, CoCrB or CoPtCrB, and a thicker second sublayer of material preferably of CoPtCrB with a lower moment than the first sublayer.

As the storage density of magnetic recording disks has increased, the product of the remanent magnetization $M_r$ (the magnetic moment per unit volume of ferromagnetic material) and the magnetic layer thickness t has decreased. Similarly, the coercive field or coercivity ($H_c$) of the magnetic layer has increased. This has led to a decrease in the ratio $M_r t/H_c$. To achieve the reduction in $M_r t$, the thickness t of the magnetic layer can be reduced, but only to a limit because the layer will exhibit increasing magnetic decay, which has been attributed to thermal activation of small magnetic grains, i.e. the superparamagnetic effect. The thermal stability of a magnetic grain is to a large extent determined by $K_u V$, where $K_u$ is the magnetic anisotropy constant of the layer and V is the volume of the magnetic grain. As the layer thickness is decreased, V decreases. At some point, as V decreases, the stored magnetic information will no longer be stable under the storage device's operating conditions.

One approach to the solution of this problem is to use a higher anisotropy material, i.e. one with a higher $K_u$. However, the increase in $K_u$ is limited by the point where the coercivity $H_c$, which is approximately equal to $K_u/M_r$, becomes too great to be written by a practical write heads.

A similar approach is to reduce the $M_r$ of the magnetic layer for a fixed layer thickness, but this is also limited by the coercivity that can be written. Another solution is to increase the intergranular exchange, so that the effective magnetic volume V of the magnetic grains is increased. However, this approach has been shown to be deleterious to the intrinsic signal-to-noise ratio (SNR) of the magnetic layer.

Substantially improved SNR can be achieved by replacing a single magnetic layer with a laminated magnetic layer stack of two (or more) magnetic layers separated by nonmagnetic spacer layers. The reduction in media noise by lamination is believed due to a decoupling of the magnetic exchange coupling between the magnetic layers in the laminate. Spacer layer materials, including Cr, CrV, Mo and Ru, with thicknesses, from 5 to 400 A have been reported to achieve good decoupling of the magnetic layers. Even a discontinuous chromium film has been claimed to reduce the exchange coupling between the two magnetic layers.

Published US patent application 2002/0098390 describes a laminated medium for horizontal magnetic recording that includes an antiferromagnetically (AF)-coupled magnetic layer structure and a conventional single magnetic layer. The AF-coupled magnetic layer structure has a net remanent magnetization-thickness product ($M_r t$) which is the difference in the $M_r t$ values of its two ferromagnetic films. The type of ferromagnetic material and the thickness values of the ferromagnetic films are chosen so that the net moment in zero applied field will be low, but nonzero. The $M_r t$ for the media is given by the sum of the $M_r t$ of the upper magnetic layer and the $M_r t$ of the AF-coupled layer stack.

The convention for alloy composition used in this application gives the atomic percentage of an element as a subscript; for example, $CoCr_{10}$ is 10 atomic percent Cr with balance being Co and $CoPt_{11}Cr_{20}B_7$ is 11 atomic percent Pt, 20 atomic percent Cr and 7 atomic percent B with the balance being Co.

SUMMARY OF THE INVENTION

One embodiment of the invention is a laminated magnetic recording medium comprising two magnetic layers separated by a nonmagnetic spacer layer with the lower magnetic layer, i.e., the one farther away from the recording head, having a lower magnetic anisotropy than the upper magnetic layer that is closer to the recording head. In alternative embodiments of the invention one or both of the two magnetic layers in the laminated layer stack can be replaced with an antiferromagnetically (AF) coupled (AFC) layer structure that has an AFC-master and an AFC-slave layer separated by a spacer layer selected to antiferromagnetically couple the AFC-master and AFC-slave layers. In embodiments with one or more AFC layer structures the AFC-slave layers are ignored when adjusting the anisotropy according to the invention. For example, in an embodiment that has the lower magnetic layer replaced with an AF-coupled layer structure, the AFC-master magnetic layer is adjusted to have a lower magnetic anisotropy than the upper magnetic layer. Because the recording head field is reduced with increased distance from the head, selection of the magnetic layers according to the invention helps to respectively match the magnetic anisotropy of the relevant magnetic layer with the head field exerted on it. This matching allows the magnetic layers to be written under optimum conditions by the head at the same head write current. Magnetic media made according to the invention show a single sharp peak in the DC erase noise vs. head write current plot which indicates that the magnetic transitions in the non-slave magnetic layers are written (switch) at the same head write current, leading to the improved magnetic recording performance. In comparison, media using the same magnetic material for both the upper and AFC-master magnetic layers shows double peaks in the DC erase noise vs. head write current plot, indicating an unfavorable write condition in which the two magnetic layers are switched at different head write current. The benefits of the invention are that magnetic pulse width ($PW_{50}$) is reduced, overwrite (OW) is improved and media signal-to-noise ratio ($S_o NR$) is improved. In one embodiment the upper magnetic layer is selected as a high magnetization alloy so that a thinner layer can be used to achieve the same $M_r t$ and further improve overwrite.

DETAILED DESCRIPTION OF THE INVENTION AND THE PREFERRED EMBODIMENTS

Figure 1:
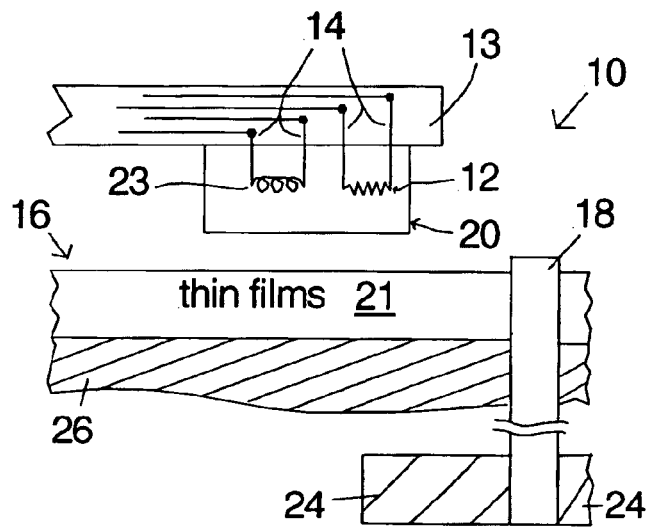
FIG. 1 is a symbolic illustration of the prior art showing the relationships between the head and associated components in a disk drive.
Figure 2:
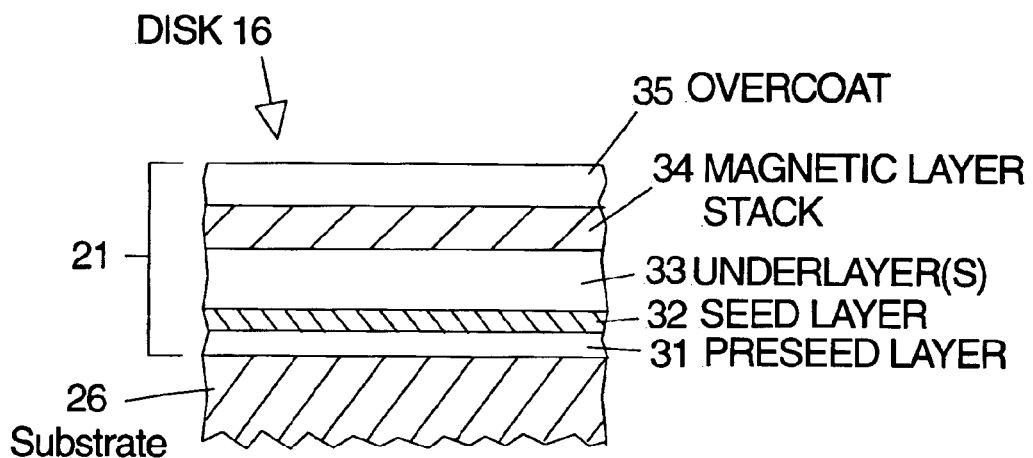
FIG. 2 is an illustration of a prior art layer structure for a magnetic thin film disk with which the magnetic layer stack of the invention can be used.

FIG. 2 illustrates a prior art layer structure 21 of a thin film magnetic disk 16 in which the layer stack according to the invention can be used. The layers under the underlayer 33 may be any of several combinations of seed layers 32 and pre-seed layers 31 as noted in more detail below. Useful pre-seed layers include but are not limited to CrTi, CrTiAl or CrTiY. Seed layers are typically used on nonmetallic substrates, but the invention can also be used with metallic substrates such as NiP-coated AlMg. Conventionally NiP-coated AlMg substrates are used with an underlayer structure of Cr, Cr alloy or multiple Cr and Cr alloy layers which are sputter deposited directly onto the NiP. The invention is also not dependent on any particular underlayer being used.

Figure 3:
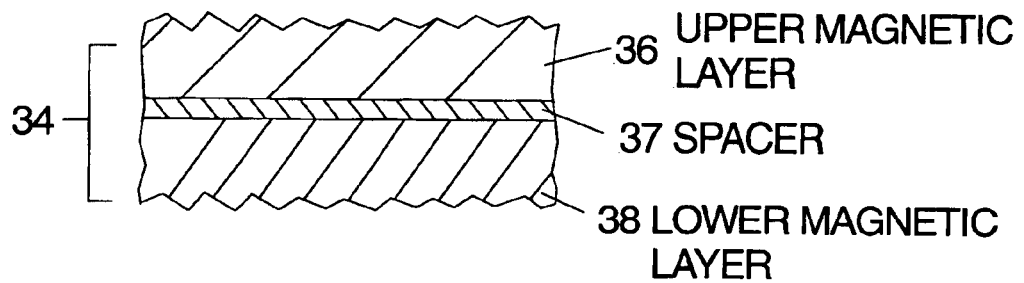
FIG. 3 is an illustration of a two layer laminated magnetic layer stack for a magnetic thin film disk according to the invention.

The layer structure shown in FIG. 2 can be used with a variety of magnetic layer stacks 34. For example, two or more laminated magnetic layers can be used and antiferromagnetically coupled layers structures can be substituted for any or all of the magnetic layers. One embodiment of the magnetic layer stack 34 is composed of a plurality of layers which are further illustrated in FIG. 3. A first embodiment of a layer stack 34 according to the invention is a laminated structure including an upper magnetic layer 36 (the magnetic layer nearest to the surface of the disk and, therefore, the head), a spacer layer 37 and a lower magnetic layer 38. The material for the lower magnetic layer 38 is selected to have a lower magnetic anisotropy than the upper magnetic layer 36. The magnetic anisotropy can be adjusted primarily by changing the atomic percentage of platinum in a cobalt based magnetic alloy such as CoPtCr, CoPtCrTa or CoPtCrB. A higher atomic percentage of platinum yields higher magnetic anisotropy. Chromium and boron content may also affect magnetic anisotropy of the magnetic material. Generally lower chromium and/or boron content result in higher magnetic anisotropy. It is preferable, although not required, to use material with high magnetization as the upper magnetic layer to achieve the same $M_r t$ at lower thickness to further improve OW. The magnetization can be adjusted by altering the atomic percentage of chromium and/or boron. For example, lowering chromium and/or boron content and increasing the cobalt content will increase the magnetization.

Figure 4:
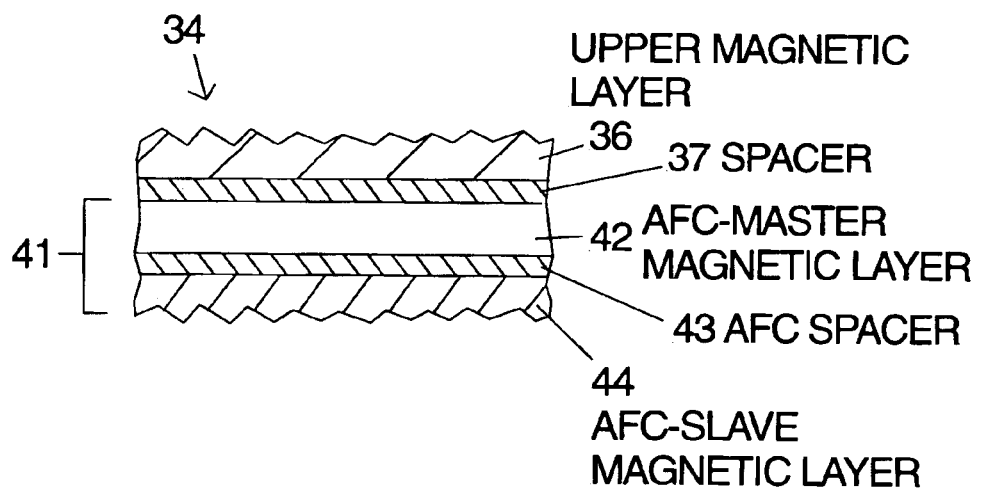
FIG. 4 is an illustration of a laminated magnetic layer stack with the lower magnetic layer replaced with an antiferromagnetically coupled magnetic layer stack for a magnetic thin film disk according to the invention.

A second embodiment of the layer stack 34 is illustrated in FIG. 4. As noted above an antiferromagnetically coupled layer structure can be substituted for any or all of the magnetic layers in a laminated layer stack. The embodiment in FIG. 4 has an antiferromagnetically coupled layer structure 41 substituted in place of the lower magnetic layer 38 of FIG. 3. An antiferromagnetically coupled layer structure 41 according to the invention has at least three distinct layers with the magnetic layers antiferromagnetically coupled through the nonmagnetic spacer layer. The two magnetic layers of the antiferromagnetically coupled layer structure 41 will be referred to as AFC-master magnetic layer 42 for the upper one and AFC-slave magnetic layer 44 for the lower one. Each of these layers is a ferromagnetic material of the type used in the prior art of thin film disks. Examples of materials suitable include CoCr, CoCrB, CoCrTa, CoPtCr, CoPtCrTa and CoPtCrB. The thickness of the AFC-slave magnetic layer 44 must be chosen so that its $M_r t$ is lower than that of the AFC-master magnetic layer 42. The AFC spacer layer 43 is a nonmagnetic material with a thickness that is selected to antiferromagnetically couple the AFC-master magnetic layer 42 with the AFC-slave magnetic layer 44. Ruthenium is the preferred material for the coupling/spacer layer 43, but the prior art indicates that suitable materials include chromium (Cr), rhodium (Rh), iridium (Ir), copper (Cu), and their alloys. The thickness of the AFC spacer layer 43 is according to the prior art; for example, approximately 6 Angstroms is a preferred target thickness for a ruthenium AFC spacer layer 43. The upper magnetic layer 36 according to the invention is a ferromagnetic material having a higher magnetic anisotropy than AFC-master magnetic layer 42. The recording head field is reduced with increase of distance from the head. Consequently, at a given head write current the head field exerted on the AFC-master magnetic layer is weaker than that on the upper magnetic layer. Therefore, in order to respectively match the magnetic anisotropy of the relevant magnetic layer with the head field exerted on it, the AFC-master magnetic layer needs to have lower magnetic anisotropy than the upper magnetic layer. The difference in the magnetic anisotropy of the two magnetic layers depends on the characteristics of head field reduction with distance. The upper magnetic layer also preferably has high magnetization.

In an alternative embodiment the upper magnetic layer 36 can be replaced with an AF-coupled layer structure 41. The layers for this embodiment are the same as shown in FIG. 4 except that AF-coupled layer structure is on top. In this alternative embodiment the lower magnetic layer 38 has a lower magnetic anisotropy than the AFC-master magnetic layer 42. The AFC-master magnetic layer preferably has high magnetization.

In an alternative embodiment the upper magnetic layer 36 and the lower magnetic layer 38 can be respectively replaced with two AF-coupled layer structures 41. In this alternative embodiment the AFC-master magnetic layer in the AF-coupled structure replacing lower magnetic layer 38 has a lower magnetic anisotropy than the AFC-master magnetic layer in the AF-coupled structure replacing upper magnetic layer 36. The AFC-master magnetic layer in the AF-coupled structure replacing upper magnetic layer 36 preferably has high magnetization.

Tables 1–5 compare nine experimental disks two at a time to isolate differences resulting from a change in a single characteristic. The media structure is that shown in FIGS. 2 and 4. The materials for each of the layers are shown in the caption or in the body of the table for each of the test disks. The $K_u V/kT$ value is for the complete media. Each of the disks has a pre-seed layer of $CrTi_{50}$ and a seed layer of $RuAl_{50}$. Table 1 compares two disks with different alloys for the AFC-master magnetic layer 42 in an antiferromagnetically coupled magnetic layer stack 34 as illustrated in FIG. 4. Disk 1 has an AFC-master magnetic layer with lower magnetic anisotropy ($CoPt_{11}Cr_{20}B_7$) than the upper magnetic layer ($CoPt_{12}Cr_{14}B_{11}$). The AFC-master magnetic layer and the upper magnetic layer in Disk 2 are made from the same material ($CoPt_{12}Cr_{14}B_{11}$). The thickness of the AFC-master magnetic layer in Disk 1 is adjusted so that Disk 1 has similar thermal stability to Disk 2 as indicated by their $K_u V/kT$ values (Disk 1=73; Disk 2=74). The fact that the two disks have similar thermal stability shows that the improved recording performance of Disk 1 over Disk 2 has not been achieved by sacrificing thermal stability. The results show that Disk 1 is improved over Disk 2 in that OW is higher by 3.5 dB, $PW_{50}$ is lower by 3.9 nm at even higher amplitude and $S_oNR$ is higher by 0.9 dB.

TABLE 1

$CrTi_{50}/RuAl_{50}$/underlayer/$CoCr_{10}$/Ru/AFC-master magnetic layer/Ru/$CoPt_{12}Cr_{14}B_{11}$

| | AFC-master Magnetic Layer | $H_c$ (Oe) | $M_r t$ (memu/cm²) | $S_oNR$ | OW (dB) | $PW_{50}$ (nm) | LFTAA (mv) | $K_u V/kT$ |
|---|---|---|---|---|---|---|---|---|
| DISK 1 | $CoPt_{11}Cr_{20}B_7$ | 3762 | 0.65 | 31.0 | 25.4 | 123.4 | 1.560 | 73 |
| DISK 2 | $CoPt_{12}Cr_{14}B_{11}$ | 3998 | 0.69 | 30.1 | 21.9 | 127.3 | 1.362 | 74 |

The data in Table 2 compare Disk 1 with Disk 3. Disk 3 has an upper magnetic layer with a higher magnetization than that of Disk 1, but is otherwise the same. Disk 3 has 0.4 dB OW better than Disk 1 and its thermal stability with $K_uV/kT$ equal to 76 is even higher than that of Disk 1 ($K_uV/kT=73$). Disks 1–3 all have an underlayer of $CrTi_{10}$. Disks 4–7 use $CrTi_{20}$ for the underlayer which helps to reduce $PW_{50}$ at increased amplitude.

Table 3 illustrates the applicant's finding that the OW of the laminated AF-coupled media can be improved by thinning the AFC-master magnetic layer to a certain extent without significantly affecting thermal stability. Table 3 compares disks 4 and 6 which differ in the thickness of their AFC-master magnetic layer and, therefore, $M_rt$. Disk 6 which has the thinner AFC-master magnetic layer has 1.2 dB higher OW than Disk 4 with only one unit reduction in $K_uV/kT$.

TABLE 2

$CrTi_{50}/RuAl_{50}/underlayer/CoCr_{10}/Ru/CoPt_{11}Cr_{20}B_7/Ru/upper$ magnetic layer

| | Upper Magnetic Layer | $H_c$ (Oe) | $M_rt$ (memu/cm²) | $S_oNR$ | OW (dB) | $PW_{50}$ (nm) | LFTAA (mv) | $K_uV/kT$ |
|---|---|---|---|---|---|---|---|---|
| DISK 3 | $CoPt_{12}Cr_{16}B_9$ | 3850 | 0.65 | 30.9 | 25.8 | 124.2 | 1.566 | 76 |
| DISK 1 | $CoPt_{12}Cr_{14}B_{11}$ | 3762 | 0.65 | 31.0 | 25.4 | 123.4 | 1.560 | 73 |

TABLE 3

$CrTi_{50}/RuAl_{50}/CrTi_{20}/CoCr_{10}/Ru/CoPt_{11}Cr_{20}B_7$ (Mrt varied)/$Ru/CoPt_{12}Cr_{16}B_9$

| | $M_rt$ (memu/cm²) AFC-master Magnetic Layer | $H_c$ (Oe) | $M_rt$ (memu/cm²) | $S_oNR$ | OW (dB) | $PW_{50}$ (nm) | LFTAA (mv) | $K_uV/kT$ |
|---|---|---|---|---|---|---|---|---|
| DISK 6 | 0.34 | 3594 | 0.64 | 26.3 | 25.7 | 125.6 | 1.884 | 75 |
| DISK 4 | 0.38 | 3674 | 0.67 | 26.2 | 24.5 | 127.8 | 1.982 | 76 |

TABLE 4

$CrTi_{50}/RuAl_{50}/CrTi_{20}/CoCr_{10}/Ru/CoPt_{11}Cr_{20}B_7/Ru/upper$ magnetic layer

| | Upper Magnetic Layer | $H_c$ (Oe) | $M_rt$ (memu/cm²) | AC Squeeze | $S_oNR$ | OW (dB) | $PW_{50}$ (nm) | LFTAA (mV) | $K_uV/kT$ |
|---|---|---|---|---|---|---|---|---|---|
| DISK 7 | $CoPt_{13}Cr_{19}B_7$ | 3736 | 0.58 | 53.8 | 26.9 | 25.5 | 119.2 | 1.476 | 75 |
| DISK 6 | $CoPt_{12}Cr_{16}B_9$ | 3594 | 0.64 | 48.4 | 26.5 | 25.5 | 120.4 | 1.606 | 75 |

Table 4 compares Disk 6 with Disk 7 to show that increased anisotropy of the upper magnetic layer reduces side band erase. Disk 7 which uses the higher anisotropy upper magnetic layer ($CoPt_{13}Cr_{19}B_7$) has higher AC squeeze which leads to reduction in the width of the side erase band. Thermal stability and OW of Disk 7 are maintained at the same level as disk 6 due to the changes in $M_rt$ and $H_c$.

The OW of the laminated AF-coupled disk structure according to the invention can be further improved by using a thinner Ru upper spacer layer 41 between the upper and AFC-master magnetic layers. Tables 5 and 6 show that the OW is increased by 1 dB when the upper space layer thickness is reduced from 1.2 nm (Disk 9) to 0.8 nm (Disk 8).

TABLE 5

$CrTi_{50}/RuAl_{50}/CrTi_{20}/CoCr_{10}/Ru/CoPt_{11}Cr_{20}B_7/Ru(thickness$ varied)/$CoPt_{13}Cr_{19}B_7$

| | Ru thickness (nm) | $H_c$ (Oe) | $M_rt$ (memu/cm²) | $S_oNR$ | OW (dB) | $PW_{50}$ (nm) | LFTAA (mv) |
|---|---|---|---|---|---|---|---|
| DISK 8 | 0.8 | 3694 | 0.58 | 27.7 | 23.7 | 118.6 | 1.476 |
| DISK 9 | 1.2 | 3712 | 0.58 | 27.5 | 22.7 | 118.3 | 1.606 |

TABLE 6

$CrTi_{50}/RuAl_{50}/CrTi_{20}/CoCr_{10}/Ru/CoPt_{11}Cr_{20}B_7/Ru(thickness$ varied)/$CoPt_{12}Cr_{20}B_6$

| Ru thickness (nm) | OW (dB) |
|---|---|
| 0.6 | 28.1 |
| 0.8 | 28.1 |
| 1.0 | 27.5 |
| 1.2 | 27.1 |

Figure 5:
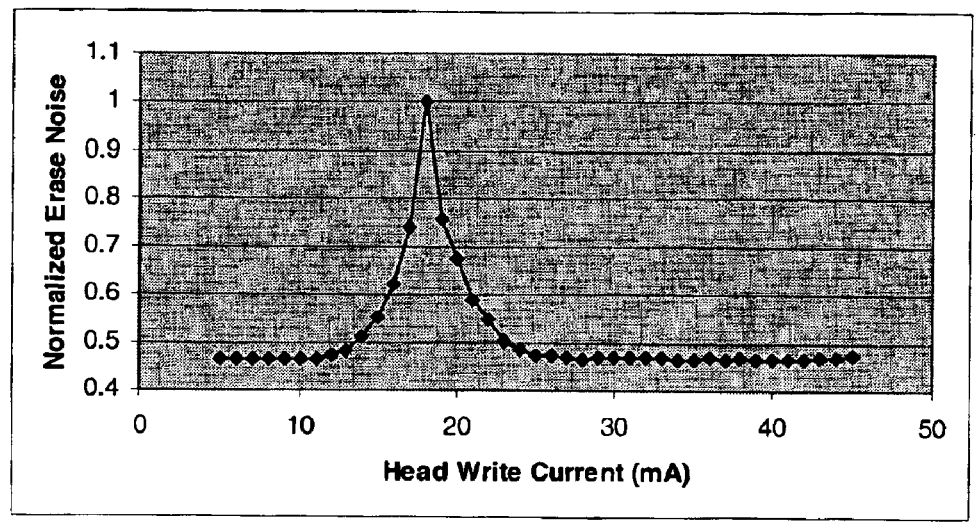
FIG. 5 is a graph of normalized DC erase noise vs. head write current for Disk 4 with magnetic materials selected according to the invention.
Figure 6:
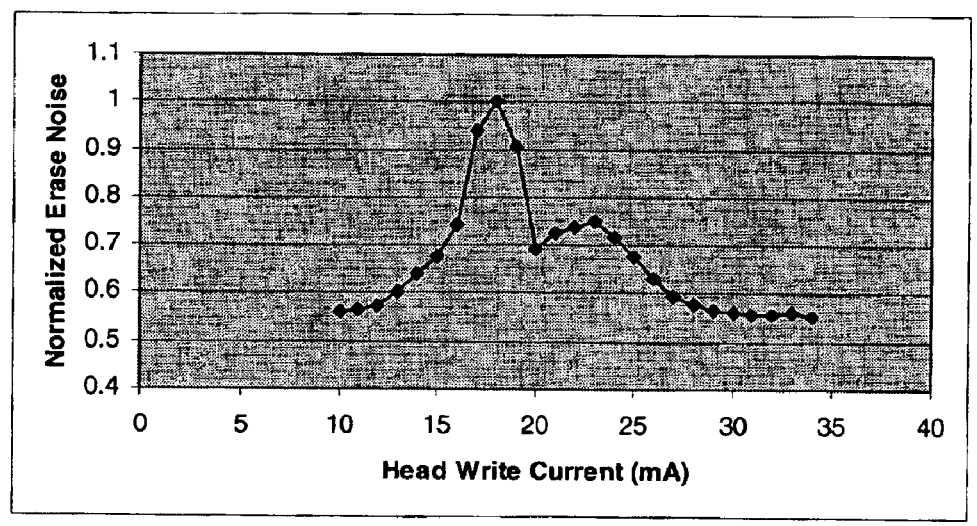
FIG. 6 is a graph of normalized DC erase noise vs. head write current for a disk using the same magnetic material for both the upper and the AFC-master magnetic layers (similar to Disk 2) according to the prior art.

As discussed earlier, Disk 4 selects magnetic materials with different magnetic anisotropy according to the invention to respectively match the magnetic anisotropy of the relevant magnetic layer with the head field exerted on it. As a result, a single sharp peak is observed in the normalized DC erase noise vs. head write current plot (FIG. 5), which indicates that the magnetic switching of both the upper magnetic layer and the AFC-master magnetic layer occurs at the same head write current, leading to the improved magnetic recording performance. In comparison, a prior art disk using the same magnetic material for both the upper and AFC-master magnetic layers (similar to Disk 2) shows double peaks in the normalized DC erase noise vs. head write current plot (FIG. 6), indicating an unfavorable write condition in which the two magnetic layers are switched at different head write current. This measurement can be used to adjust the magnetic anisotropy. For example, the peak at the lower head write current in the graph of FIG. 6 corresponds to the switching point of the magnetic layer closest to the head, i.e., the upper magnetic layer. Therefore, to bring the switching of the lower magnetic layer, i.e., the AFC-master magnetic layer, more in line with the upper magnetic layer, the magnetic anisotropy of the AFC-master magnetic layer should be lowered which will allow it to switch at a lower head write current. Tuning using the DC erase noise is a useful technique, but the actual recording performance measurements as discussed above can also be used.

The thin film structures described above can be formed using standard sputtering techniques. The films are sequentially sputter deposited with each film being deposited on the previous film. The atomic percent compositions given above are given without regard for the small amounts of contamination that invariably exist in sputtered thin films as is well known to those skilled in the art.

The invention has been described with respect to particular embodiments, but other uses and applications for the ferromagnetic structure according to the invention will be apparent to those skilled in the art.

What is claimed is:

1. A thin film magnetic recording medium for use with a magnetic recording head comprising:

a layer stack on a substrate, said layer stack comprising;

a first antiferromagnetically coupled magnetic layer structure having a; and first AFC-master ferromagnetic layer and a first AFC-slave; ferromagnetic layer that are antiferromagnetically coupled across a first spacer layer, the first AFC-master ferromagnetic layer having a first magnetic anisotropy;

a second spacer layer adjacent to the first AFC-slave ferromagnetic layer; and a second antiferromagnetically coupled magnetic layer structure, disposed below the first antiferromagnetically coupled magnetic layer structure and the second spacer layer, having a second AFC-master ferromagnetic layer and a second AFC-slave ferromagnetic layer that are antiferromagnetically coupled across a third spacer layer, the second AFC-master ferromagnetic layer having a second magnetic anisotropy that is lower than the first magnetic anisotropy by an amount selected to compensate for a lower magnetic field from the magnetic recording head due to a larger distance between the magnetic recording head and the second AFC-master ferromagnetic layer, the second antiferromagnetically coupled magnetic layer structure being disposed so that the second spacer layer separates the second AFC-master ferromagnetic layer from the first AFC-slave ferromagnetic layer.

2. The thin film magnetic recording medium of claim 1 wherein the first AEC-master ferromagnetic layer switches in response to a first magnetic field generated by a first write current magnitude in the magnetic recording head and the second AFC-master ferromagnetic layer switches in response to a second magnetic field generated by a second write current magnitude in the magnetic recording head and the first and second write current magnitudes are approximately equal.

3. The thin film magnetic recording medium of claim 1 wherein normalized DC erase noise plotted versus a write current in the magnetic recording head has a single peak.

4. The thin film magnetic recording medium of claim 1 wherein the first and second AFC-master ferromagnetic layers include cobalt and platinum and the second AFC-master ferromagnetic layer has a lower atomic percentage of platinum than the first AFC-master ferromagnetic layer.

5. The thin film magnetic recording medium of claim 1 wherein the first and second AFC-master ferromagnetic layers comprise cobalt, platinum, chromium and boron and the second AFC-master ferromagnetic layer has a lower atomic percentage of platinum than the first AFC-master ferromagnetic layer.

6. The thin film magnetic recording medium of claim 1 wherein the first AFC-master ferromagnetic layer has a magnetization which is higher than a magnetization of the second AFC-master ferromagnetic layer.

* * * * *